(12) United States Patent
Papagerogiou

(10) Patent No.: US 9,041,600 B2
(45) Date of Patent: May 26, 2015

(54) USE OF GPS TO DETECT REPETITIVE MOTION

(75) Inventor: Andrew Papagerogiou, Cambourne (GB)

(73) Assignee: Cambridge Silicon Radio Limited, Cambridge (GB)

( * ) Notice: Subject to any disclaimer, the term of this patent is extended or adjusted under 35 U.S.C. 154(b) by 426 days.

(21) Appl. No.: 13/022,729

(22) Filed: Feb. 8, 2011

(65) Prior Publication Data

US 2012/0200455 A1    Aug. 9, 2012

(51) Int. Cl.
| | |
|---|---|
| *G01S 19/40* | (2010.01) |
| *G01S 19/19* | (2010.01) |
| *G01S 19/30* | (2010.01) |
| *G01S 19/37* | (2010.01) |
| *G01C 22/00* | (2006.01) |
| *G01S 19/43* | (2010.01) |

(52) U.S. Cl.
CPC ............. *G01S 19/40* (2013.01); *G01S 19/30* (2013.01); *G01S 19/37* (2013.01); *G01C 22/006* (2013.01); *G01S 19/19* (2013.01); *G01S 19/43* (2013.01)

(58) Field of Classification Search
CPC ........................................................ G01S 19/19
USPC ..................................... 342/357.57; 702/142
See application file for complete search history.

(56) References Cited

U.S. PATENT DOCUMENTS

| | | | | |
|---|---|---|---|---|
| 4,689,626 | A * | 8/1987 | Hori et al. ................. | 342/357.62 |
| 5,081,462 | A * | 1/1992 | Tachita et al. ................. | 342/352 |
| 5,926,131 | A | 7/1999 | Sakumoto et al. | |
| 6,009,375 | A | 12/1999 | Sakumoto et al. | |
| 6,067,503 | A * | 5/2000 | Yakos ........................... | 701/468 |
| 6,254,513 | B1 | 7/2001 | Takenaka et al. | |
| 6,285,314 | B1 * | 9/2001 | Nagatsuma et al. ...... | 342/357.57 |
| 6,434,212 | B2 | 8/2002 | Pyles | |
| 6,473,483 | B2 | 10/2002 | Pyles | |
| 6,520,448 | B1 | 2/2003 | Doty et al. | |
| 6,532,432 | B1 * | 3/2003 | Nagatsuma et al. .......... | 702/149 |
| 6,738,015 | B1 * | 5/2004 | Linhart et al. ............ | 342/357.31 |
| 6,850,844 | B1 | 2/2005 | Walters et al. | |
| 6,914,931 | B2 * | 7/2005 | Douglas et al. ................ | 375/147 |
| 7,151,486 | B2 * | 12/2006 | Kim ........................ | 342/357.59 |
| 7,263,461 | B2 | 8/2007 | Sugai | |
| 7,353,986 | B2 | 4/2008 | Sugai | |
| 7,376,533 | B2 | 5/2008 | Fujiwara | |
| 7,663,541 | B2 * | 2/2010 | Klinghult et al. ......... | 342/357.29 |
| 7,667,642 | B1 * | 2/2010 | Frericks et al. .......... | 342/357.57 |
| 8,063,818 | B2 * | 11/2011 | Stafford .................... | 342/357.62 |
| 8,248,300 | B2 * | 8/2012 | Buck et al. ................ | 342/357.62 |
| 2012/0109518 | A1 | 5/2012 | Huang | |

FOREIGN PATENT DOCUMENTS

| | | | | |
|---|---|---|---|---|
| JP | 2004317182 A | | 11/2004 | |
| JP | 2004317182 A | * | 11/2004 | ............. G01C 13/00 |
| JP | 2005083998 A | * | 3/2005 | ............. G01C 13/00 |
| WO | WO 00/17669 | | 3/2000 | |
| WO | WO 01/42809 | | 6/2001 | |

OTHER PUBLICATIONS

Great Britain Search Report for GB Application No. GB1202197.8, dated Jul. 6, 1012.
Terrier et al., "How useful is satellite positioning system (GPS) to track gait parameters? A review", Journal of NeuroEngineering and Rehabilitation, Sep. 2, 2005.
GB Examination Report issued in related GB Application No. 1202197.8, dated May 27, 2014.

* cited by examiner

*Primary Examiner* — Gregory C Issing
(74) *Attorney, Agent, or Firm* — RatnerPrestia

(57) ABSTRACT

A system mounted to an object for detecting repetitive motion of the object. The system includes a GPS receiver for receiving GPS signals while being maneuvered in a repetitive motion by the object, and a processor for detecting repetitive phase shifts in the received GPS signals. In general, the system computes the repetitive motion of the GPS receiver based on the repetitive phase shifts.

20 Claims, 5 Drawing Sheets

USE OF GPS TO DETECT REPETITIVE MOTION

The present invention relates, in general, to a system for detecting repetitive motion of an object. More specifically, the present invention relates to a GPS receiver which utilizes repetitive phase shifts in received GPS signals to compute the repetitive motion of the object.

BACKGROUND

In conventional GPS systems, location of a GPS receiver may be computed based on signals received from GPS satellites. However, these conventional GPS systems do not utilize GPS signals to compute a repetitive motion of the GPS receiver.

In some systems, a micro-electronic-mechanical-system (MEMS) device (e.g. accelerometer) and associated circuitry may be integrated with the GPS receiver in order to compute repetitive motion of an object. These systems generally suffer from an increase in device size as well as an increase in power consumption due to the inclusion of a MEMS device. Also, mechanical moving parts somewhat compromise the accuracy and shelf life of these systems.

In one example, a system (as described above) may be included in a device (e.g. watch) that is worn by an user performing an exercise (e.g. jogging). The GPS capabilities of the device allow for the location of the jogger to be tracked over a period of time. The MEMS device also allows for the system to compute the stride rate (repetitive motion) of the jogger which may be beneficial to computing statistics and other useful information.

However, as described above, inclusion of a MEMS device may generally increase the size of the device which may not be comfortable for the user. The MEMS device may also consume power from the battery of the device, which may reduce the operating time of the device.

SUMMARY

To meet this and other needs, and in view of its purposes, the present invention provides a system configured to be attached to an object for detecting repetitive motion of the object. The system may include a GPS receiver for receiving GPS signals while being maneuvered in a repetitive motion by the object. The system may also include a processor for detecting repetitive phase shifts in the received GPS signals, and computing the repetitive motion and/or location of the GPS receiver based on the repetitive phase shifts. It is understood that the foregoing general description and the following detailed description are exemplary, but not restrictive, of the invention.

DETAILED DESCRIPTION

As will be described, the example embodiments provide a GPS based system for computing repetitive motion. Specifically, the example GPS system may include a GPS device mounted to an object (e.g., a user, a machine, a vehicle, etc. . . . ). The GPS device may include a GPS receiver for computing location of the GPS device, and a processor for computing repetitive motion of the GPS device. In general, the GPS receiver receives GPS signals from one or more GPS satellites. The received GPS signals are then processed (by the processor) to compute repetitive motion (i.e., the period) of an object to which the device is mounted. In general, the repetitive motion may be computed based on repetitive phase shifts detected in the received GPS signals.

In one embodiment, the repetitive motion may be utilized to compute other metrics and statistics (e.g. instantaneous/average stride rate) which may be beneficial in characterizing the behavior of the object to which the device is mounted. The repetitive motion may also aid in computing the location of the GPS device. For example, the repetitive motion may be utilized by a tracking filter in the GPS receiver to compensate for repetitive phase jitter in the GPS signals.

Figure 1:
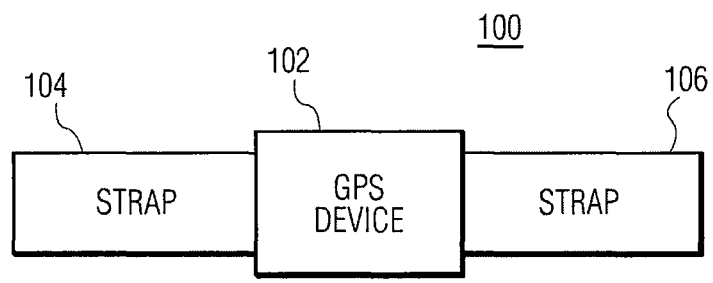
FIG. 1 is a view of a GPS device which is mounted to an object with straps, according to an embodiment of the invention.

In one embodiment, as shown in FIG. 1, GPS system 100 may include a GPS device 102 and mounting straps 104 and 106. In general, GPS system 100 may be mounted to an object such as a user, vehicle, machine or any other object that may perform repetitive motion. Furthermore, GPS device 102 may be mounted to the object with the straps as shown in FIG. 1 or any other type of mounting hardware such as brackets, bolts, soldered on a circuit board, etc. Once GPS device 102 is mounted to a particular object, the location and repetitive motion of that object may be computed based on received GPS signals.

For example, in one application, GPS device 102 may be included in a wristwatch worn by a jogger. As the jogger traverses a jogging trail, the GPS device tracks the location of the jogger over time (i.e., the path of the jogger) as well as the repetitive motion of the GPS device (i.e., the stride rate of the jogger).

As the jogger is maneuvering the trail, natural back and forth repetitive motion of the user's arm (i.e., to which the GPS device is mounted) may provide stride rate information that may be utilized along with the location information to provide metrics and statistics to the jogger. For example, the location information of the GPS device may be used to display the path followed by the jogger throughout the exercise. The repetitive motion information of the GPS device may be utilized to display the stride rate (i.e., frequency and number of steps) taken by the jogger during the exercise. Both the location information and repetitive motion information may also be utilized in combination to determine other metrics and statistics such as the stride length of the jogger during the exercise.

Figure 2:
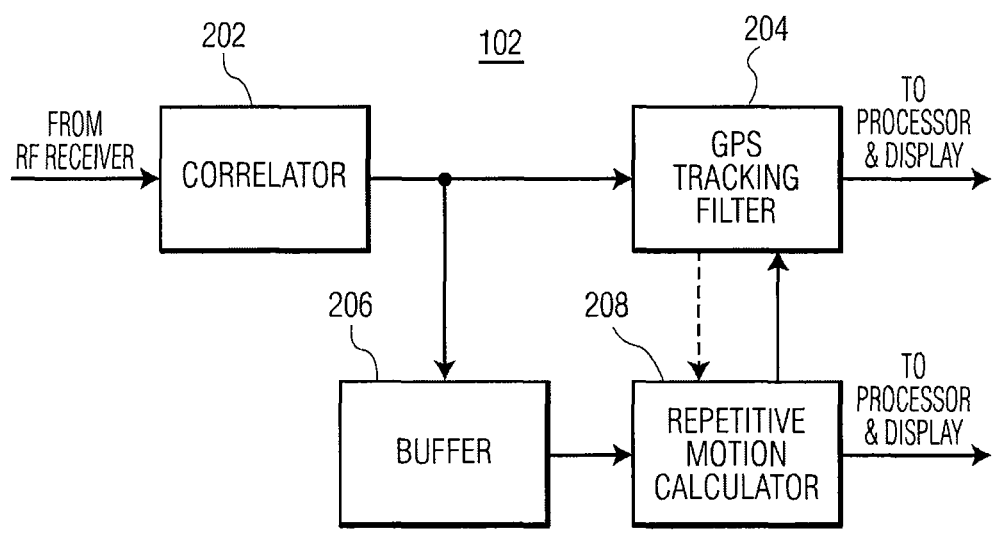
FIG. 2 is a block diagram showing the components of the GPS device in FIG. 1, according to an embodiment of the present invention.

FIG. 2 shows an embodiment on GPS device 102 which includes a correlator 202, tracking filter 204, buffer 206 and repetitive motion calculator 208. In general, GPS device 102 may receive multiple radio frequencies (RF) GPS signals from various GPS satellites. These signals may include but are not limited to course/acquisition (C/A) codes which are unique to each GPS satellite. The received signal from each of the plurality of satellites is correlated with known signals stored in correlator 202. Correlator 202 outputs the early, on time and late correlation results which indicate the clock error between the GPS device 102 and the respective satellites.

In conventional systems, these values may then be processed by GPS tracking filter 204 and a processor that may compute the location of the GPS device. However, in this embodiment, the correlation results are not only input into the GPS tracking filter 204 but also to a repetitive motion calculator. Specifically, a buffer 206 buffers the correlation values for a period of time for each satellite. Once a predetermined amount of correlation data is accumulated in buffer 206, it is input to repetitive motion calculator 208.

Since the correlation results output from correlator 202 indicate phase shifts in the received satellite signals, the repetitive motion calculator 208 may utilize these phase shifts in order to compute the repetitive motion of the device. For example, if GPS device 102 is worn on the arm of a jogger, a repetitive phase shift in the received GPS signal may be due to the motion of the jogger's arm during exercise. The repetitive motion calculator 208 may then detect and store the repetitive phase shifts of the device over a period of time.

In one embodiment, the repetitive motion calculator may compute a spectrogram which indicates how the spectral density of the correlation values vary with time. A spectrogram may be determined by computing the short time Fourier transform of the correlation values.

In another embodiment, repetitive motion calculator 208 may compute a period of a repeating pattern in successive correlation values over time. For example, correlation values may be produced every 1 ms for the C/A code. Thus, if a jogger is jogging at a stride rate of 1 Hz, then 1000 correlation results will be taken during each stride. When the forward motion is of the jogger is removed, during the first half of the stride (e.g. first 500 correlation results), the GPS device may be moving away from the satellite resulting in decreasing correlation values. Then, during the second half of the stride (e.g. last 500 correlation results), the GPS device may be moving towards the satellite resulting in increasing correlation values. Thus, the correlation values (over time) may have an oscillatory amplitude detectable by the GPS device.

In general, the repetitive phase shift is computed by repetitive motion calculator 208 and then output to a processor (not shown) which may compute and display the stride rate (or other metrics) to the jogger.

It is noted that the repetitive phase shifts for more than one satellite may be combined to increase the accuracy of the computed repetitive motion. For example, the phase shifts detected for N satellites may be combined as a weighted average. The weighting may be implemented based on any number of metrics such as the carrier to noise power ratio C/No.

In one example, the repetitive phase shift may be utilized to aid in determining the location of the GPS device. For example, the repetitive phase shift produced by 208 may be input to GPS tracking filter 204 along with the correlation results from 202. GPS tracking filter 204 which may be an adaptive filter (e.g. Kalman filter) may utilize the periodic phase shift information to remove deterministic jitter introduced by the repetitive motion. Thus, GPS tracking filter 204 may have an input to the Kalman filter which compensates (i.e. predicts the repetitive phase changes in the correlation values) for the deterministic repetitive motion, thereby suppressing noise and removing a degree of freedom in a navigation solution and reducing the variance of the bit and phase information. In general, the repetitive motion information may be beneficial to compensating for the phase error between the GPS satellite clock and GPS receiver clock. Furthermore, the bit and phase information computed by the GPS tracking filter 204 may then be utilized by a processor (not shown) to compute and display the location of the GPS device.

In another example, the repetitive phase shift may be subtracted from the output of correlator 202 thereby providing correlation values to the Kalman Filter which are independent of repetitive information. In yet another example, the repetitive phase shift may be utilized to configure a filter (e.g. notch filter) for notching out the repetitive information in the correlation values.

Optionally, as shown in FIG. 2, a satellite reference phase (computed by tracking filter 204) may be utilized by repetitive motion calculator 208. The satellite reference phase may provide a reference signal for comparing and computing the repetitive phase shifts in the correlation values. This optional signal may increase the speed and accuracy by which the repetitive motion is computed.

Figure 3:
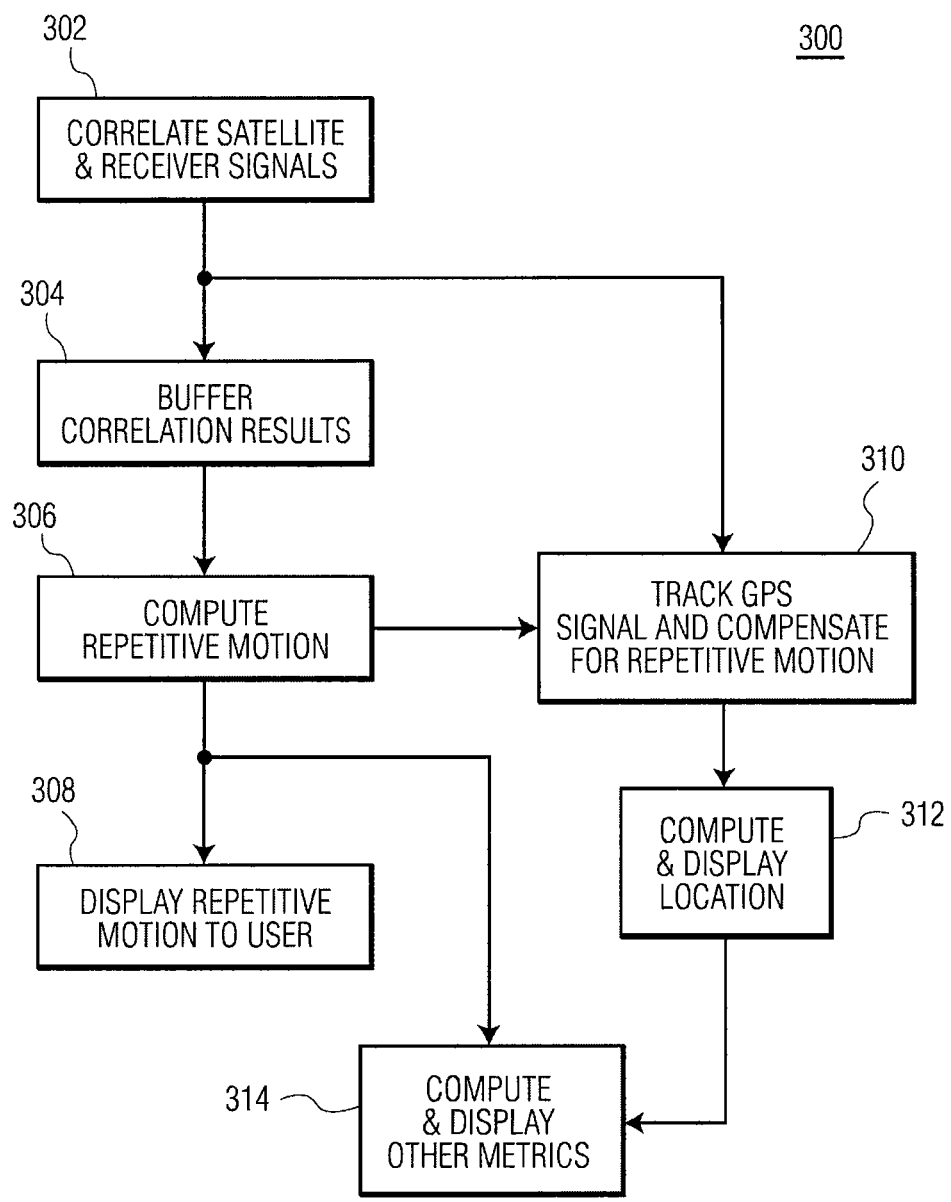
FIG. 3 is a flowchart describing the operation of the GPS device shown in FIGS. 1 and 2, according to an embodiment of the present invention.

FIG. 3 shows a flowchart of the general operation of the GPS device 102. First, the received GPS signals are correlated with the known receiver signal (step 302). The correlation values are then buffered (step 304) and used to compute repetitive motion of the object to which a GPS device is mounted (step 306). The computed repetitive motion and the correlation values are then utilized to track the GPS signals while compensating for the repetitive motion (step 310). The location of the device may then be computed and displayed (step 312). Similarly, the repetitive motion of the device may be displayed (see step 308). Also, other statistics and metrics may also be computed based on the location and repetitive motion (see step 314).

Figure 4:
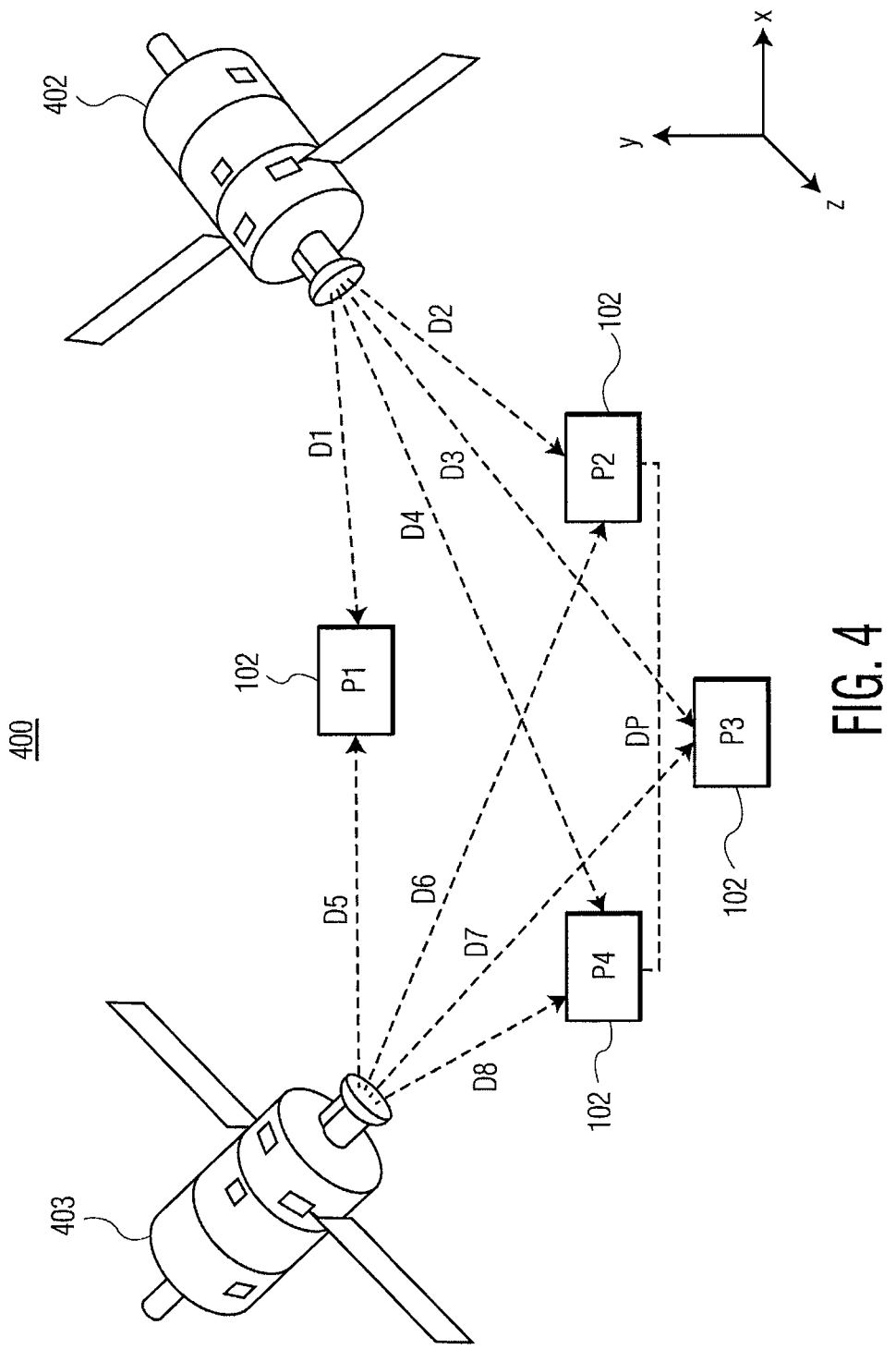
FIG. 4 is a view of a GPS system where the GPS device in FIG. 1 is receiving satellite GPS signals from different positions, according to an embodiment of the present invention.

FIG. 4 shows an example where GPS device 102 is receiving satellite signals from satellites 402 and 403. Specifically, device 102 is shown as being located at any one of four different positions (e.g., P1, P2, P3 and P4) in space. Since positions P1, P2, P3 and P4 are at different distances (e.g., D1, D2, D3 and D4) to satellite 402, and distances (D5, D6, D7 and D8) to satellite 403, they produce different correlation results (i.e., phase shifts). For example, if device 102 alternates between position P2 and P4 (e.g. a user wearing the GPS device on his arm is standing in place and is moving his arm back and forth between positions P2 and P4 separated by distance DP) in a repetitive motion, then the distance between the satellite and device 102 will alternate between D2 and D4 for satellite 402.

In response to the alternating distances between satellite 402 and device 102, correlation results output by correlator 202 may indicate a repetitive phase shift between the received signals and known signals in the correlator. Thus, regardless of whether device 102 is alternating between P1 and P3 or P2 and P4 or any other combination, the distance between the satellite 402 and receiver 102 will be repetitive as well as the phase shift output from correlator 202.

If distances D1 and D2 are equal, satellite 402 may have difficulty determining repetitive motion. In this example, the results from satellite 403 may be combined with the results from satellite 402 (i.e. distances D5 and D6 are not equal).

It is also noted that the positions may not be static positions in space. For example, positions P2 and P4 may represent the relative position of the GPS device on the user's arm. If the user starts to jog, positions P2 and P4 will no longer be static, and therefore distances D2 and D4 may change as the user jogs away from or towards the satellite. However, GPS device 102 maintains a detectable distance relationship dictated by distance DP (i.e. stride rate) between the respective positions, and therefore the difference between D2 and D4 may be utilized to compute repetitive motion.

Figure 5:
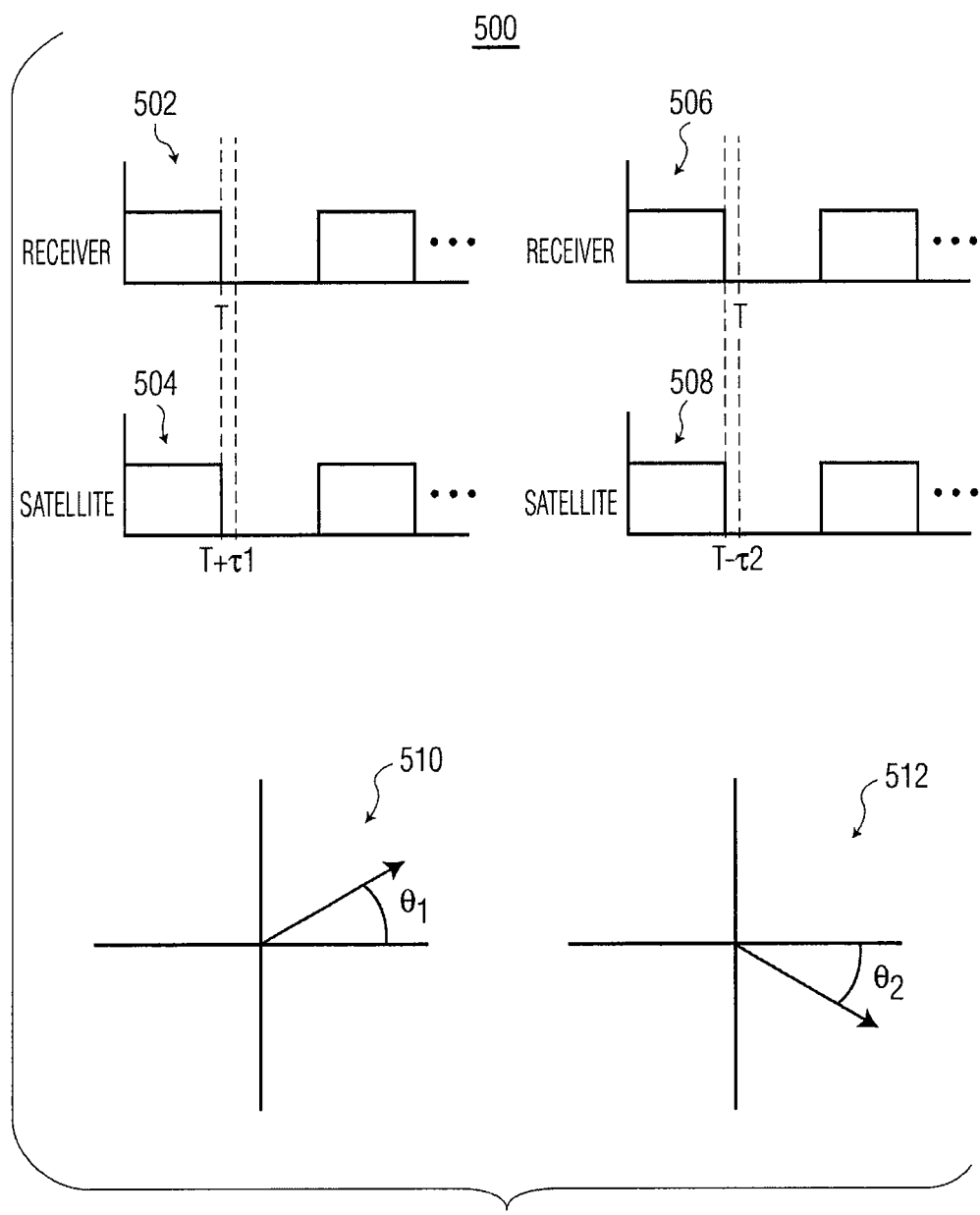
FIG. 5 shows two plots of repetitive phase shifts between the transmitted satellite signal and received satellite signal, according to an embodiment of the present invention.

FIG. 5 shows two examples of such a phase shift. As shown on the left side of FIG. 5, the known GPS signal (e.g., C/A code) 502 and GPS receiver 102 may have a bit transition at time T. Wherein the GPS device 102 located in position P4, the signal received from satellite 402 may be slightly delayed so that the bit transition occurs at time T+τ1 which results in a phase shift between the known correlator signal and the signal received from the satellite (510). If the device then moves from position P4 to position P2, the distance between the receiver 102 and satellite 402 will become a shorter distance D2. Thus, device 102 (when in position P2) may receive the satellite signal at an earlier time. This may result in a phase shift where the bit transition occurs at a time T−τ2 resulting in phase shift 512.

Therefore, if device 102 periodically alternates between position P2 and P4, a repetitive phase shift |θ1−θ2| may be computed based on the early, on time and late correlation values. As the phase shift alternates between θ1 and θ2, the repetitive motion may be calculated over a period of time (i.e., the number of phase shifts per second).

Figure 6:
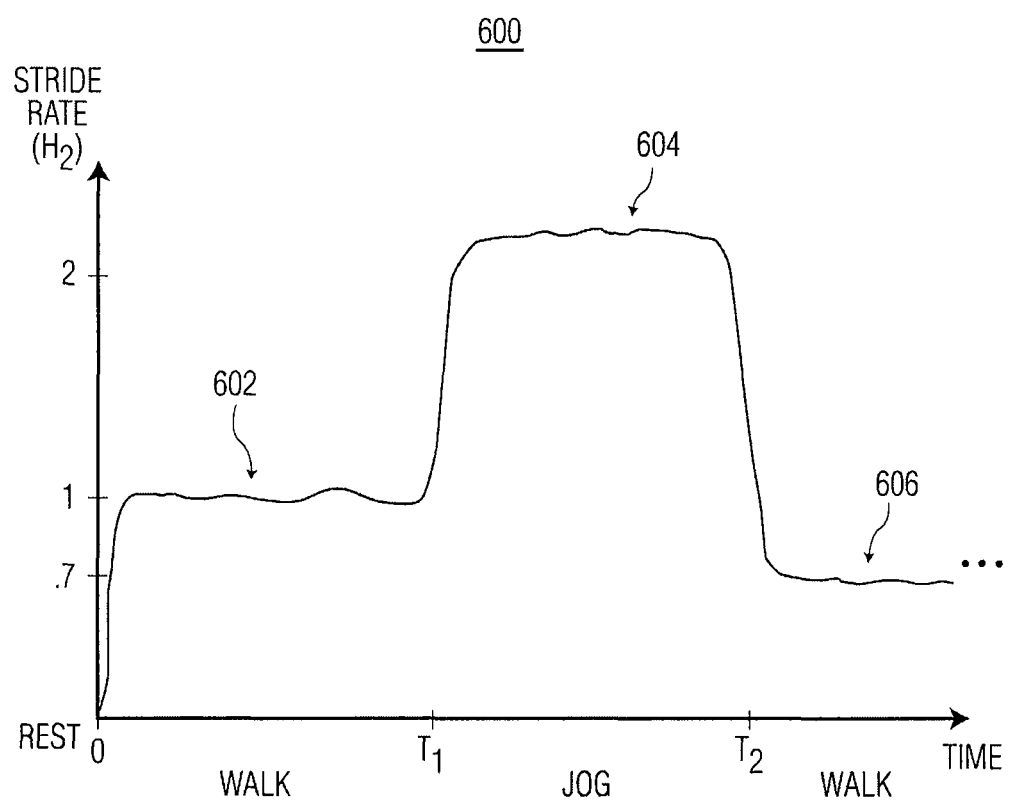
FIG. 6 is a plot of the stride rate of a user wearing the GPS device in FIG. 1 while exercising, according to an embodiment of the present invention.

In one example, the repetitive motion may be utilized to determine the stride rate of a jogger (i.e., the number of steps per second). For example, in FIG. 6, the stride rate of a jogger is plotted with respect to time. Specifically, from a resting state at time 0, the jogger begins to walk at a stride rate of one stride per second (602). At time T1, (once the jogger is warmed up), the jogger increases from a walk to a jog at a rate of two steps per second (604). At time T2 (when the jogger wants to slow down and rest), he slows down from a jogging rate to a slower walking rate of 0.7 steps per second (606).

In the jogger example described above, the stride rate information (i.e., the repetitive motion) may be displayed instantaneously to the jogger on a wristwatch or may be downloaded and plotted on a personal computer. The path that the jogger traveled may also be plotted (not shown) based on the location computed by the GPS receiver. Furthermore, the location information plotted versus time and the stride rate information plotted versus time may be utilized to compute the stride length of the jogger (i.e., the distance covered by each step of the jogger) as well as other metrics and statistics.

Although the examples describe the GPS device being mounted to a jogger, it is noted that the GPS device may be mounted to any object which performs a repetitive motion. For example, GPS device 102 may be mounted to a wing of an airplane to monitor the oscillatory characteristics of the wings of the plane encountered in different air spaces. In another example, the device 102 may be mounted to a buoy located in the ocean for monitoring the oscillatory effects of the seas (i.e., wave heights and frequencies). For example, the GPS device 102 may be mounted to a buoy which is anchored (or not anchored) to the ocean floor. In the case where the buoy is not anchored, the GPS device will monitor the exact location of the buoy and also the waves encountered by the buoy which may be then utilized to generate a history of the ocean wave characteristics in a particular region.

In general, it is noted that the GPS device 102 may be mounted to any object that performs a repetitive motion. The GPS device may also be integrated into various devices such as cellular phones. For example, a cellular phone (i.e. strapped to a user) having GPS capabilities may be configured with an exercise application. The exercise application may compute and track both the repetitive motion and location of the user via GPS signals.

In general, by utilizing the GPS signals to compute the repetitive motion (as well as the location of the device), the overall size, power consumption and production cost of the GPS device would not be increased due to the addition of a MEMS chip such as an accelerometer.

It is also noted, however, that in some systems, it may be beneficial to supplement the GPS device with a MEMS chip. In one example, the repetitive motion computed by the MEMS chip may be utilized to verify the accuracy of the repetitive motion computed by the GPS device (i.e. the stride rate computed by the GPS device may be compared to the stride rate computed by the MEMS chip). In another example, when the GPS device cannot receive GPS signals (e.g. indoor environments), the MEMS chip may take over tracking of the repetitive motion (i.e. the MEMS chip is backup to the GPS device). Then, when the GPS device is able to receive the GPS signals again, the GPS device will take over tracking repetitive motion.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system mounted to an object for detecting repetitive motion of the object, comprising:
   a GPS receiver configured to receive GPS signals while being maneuvered in a repetitive motion by the object between two relative positions;
   a correlator configured to produce correlation values based on the received GPS signals;
   a processor coupled to the correlator, the processor configured to detect phase shifts in the correlation values of the received GPS signals, determine that the phase shifts in the correlation values are repetitive phase shifts representing movement of the GPS receiver between the two relative positions, and compute the repetitive motion of the GPS receiver based on the repetitive phase shifts; and
   a GPS tracking filter coupled to the processor and the correlator, the GPS tracking filter, during tracking, configured to remove the repetitive phase shifts received from the processor from the correlation values, and track the GPS signals using the correlation values with the repetitive phase shifts removed.

2. The system of claim 1, wherein
   the correlator correlates the received GPS signals with known reference signals to produce correlation values; and the system further includes
   a buffer for buffering a predetermined number of correlation values,
   wherein the predetermined number of correlation values are used by the processor to detect the repetitive phase shifts in the received GPS signals.

3. The system of claim 2, wherein
   the GPS tracking filter tracks the received GPS signals based on the correlation values, and
   the repetitive phase shifts are used by the GPS tracking filter to predict phase jitter in the GPS signals.

4. The system of claim 2, wherein
   the correlator correlates GPS signals received by a plurality of GPS satellites, and
   the processor detects the repetitive phase shifts by combining respective repetitive phase shifts for the plurality of satellites.

5. The system of claim 1, wherein
   the processor computes a location of the system based on the repetitive motion; and the system further includes a memory for storing the computed location and repetitive motion over a period of time; and a display for displaying the location and repetitive motion information to a user.

6. The system of claim 2, wherein
the processor detects the repetitive phase shifts by monitoring successive correlation values stored in the buffer and detecting a repeating pattern.

7. A cellular phone configured to be attached to a user, comprising:
a GPS receiver configured to receive GPS signals while being maneuvered in a repetitive motion by the user between two relative positions;
a correlator configured to produce correlation values based on the received GPS signals;
a processor coupled to the correlator, the processor configured to detect phase shifts in the correlation values of the received GPS signals, determine that the phase shifts in the correlation values are repetitive phase shifts representing movement of the GPS receiver between the two relative positions, compute repetitive motion of the cellular phone and location of the cellular phone based on the repetitive phase shifts, and pass the detected repetitive phase shifts to an application running on the cellular phone; and
a GPS tracking filter coupled to the processor and the correlator, the GPS tracking filter, during tracking, configured to remove the repetitive phase shifts received from the processor from the correlation values and track the GPS signals using the correlation values with the repetitive phase shifts removed.

8. A system mounted to an object for computing a location of the object, comprising:
a GPS receiver configured to receive GPS signals while being maneuvered in a repetitive motion by the object between two relative positions;
a correlator configured to produce correlation values based on the received GPS signals;
a processor coupled to the correlator, the processor configured to detect phase shifts in the correlation values of the received GPS signals, determine that the phase shifts in the correlation values are repetitive phase shifts representing movement of the GPS receiver between the two relative positions, and compute a location of the GPS receiver,
a GPS tracking filter coupled to the processor and the correlator, the GPS tracking filter, during tracking, configured to remove the repetitive phase shifts received from the processor from the correlation values and to track the GPS signals using the correlation values with the repetitive chase shifts removed.

9. The system of claim 8, wherein
the correlator correlates the received GPS signals with known reference signals to produce correlation values.

10. The system of claim 9, wherein
the GPS tracking filter includes an adaptive Kalman filter which predicts the repetitive phase shifts that are removed from the correlation values.

11. The system of claim 9, wherein
the GPS tracking filter tracks GPS signals for a plurality of satellites, and
the processor computes repetitive phase shifts for each of the plurality of satellites.

12. The system of claim 11, wherein
the repetitive phase shifts for each satellite are weighted and averaged based on the carrier to noise power ratio for each respective satellite, and the weighted average is utilized by the GPS tracking filter to predict phase changes in the correlation values, and
a clock of the system is adjusted based on the predicted phase changes.

13. The system of claim 8, including
a memory for storing the location and repetitive motion information computed based on the phase shifts, and
a port for connecting the system to a personal computer, wherein the system uploads the stored information to the personal computer through the port.

14. The system of claim 9, wherein
the processor compares the repetitive phase shifts to a satellite reference phase computed by the GPS tracking filter.

15. A method of detecting repetitive motion of an object, where a GPS receiver is mounted to the object being maneuvered in a repetitive motion between the two relative positions, the method comprising:
receiving, by the GPS receiver, GPS signals;
producing, by a correlator, correlation values based on the received GPS signals;
detecting, by a processor coupled to the correlator, phase shifts in the correlation values of the received GPS signals, and determining that the phase shifts in the correlation values are repetitive phase shifts representing movement of the GPS receiver between the two relative positions, and computing the repetitive motion of the GPS receiver based on the repetitive phase shifts,
removing, by a GPS tracking filter, the repetitive phase shifts from the correlation values; and
tracking, by the GPS tracking filter coupled to the processor and the correlator, the received GPS signals using the correlation values with the repetitive phase shifts removed.

16. The method of claim 15, including
correlating, by the correlator, the received GPS signals with known reference signals to produce correlation values, and
buffering, by a buffer, a predetermined number of correlation values over a period of time.

17. The method of claim 16, including
detecting, by the processor, a repeating pattern for successively buffered correlation values to detect the repetitive phase shifts, or
computing by the processor, a spectrogram of the buffered correlation values to detect repetitive phase shifts.

18. The method of claim 16, including
predicting, by the GPS tracking filter, a phase error between a clock of the system and a clock of a satellite based on the repetitive phase shifts, and
adjusting the clock of the system to match the clock of the satellite.

19. The method of claim 15, including
computing, by the processor, a stride rate and location of the object over a period of time responsive to the determined repetitive phase shifts,
wherein the object is a user in motion and the stride rate is the number of steps per second taken by the user.

20. The method of claim 19, including
displaying the stride rate and location to the user when the system is included in a watch or cellular phone worn by the user, and
displaying the stride rate and location to the user when the system is connected to a personal computer.

* * * * *

UNITED STATES PATENT AND TRADEMARK OFFICE
CERTIFICATE OF CORRECTION

| | |
|---|---|
| PATENT NO. | : 9,041,600 B2 |
| APPLICATION NO. | : 13/022729 |
| DATED | : May 26, 2015 |
| INVENTOR(S) | : Papagerogiou |

It is certified that error appears in the above-identified patent and that said Letters Patent is hereby corrected as shown below:

IN THE CLAIMS

In Column 7, Line 29, in Claim 7, delete "values" and insert -- values, --, therefor.

In Column 7, Line 49, in Claim 8, delete "values" and insert -- values, --, therefor.

In Column 7, Line 51, in Claim 8, delete "chase" and insert -- phase --, therefor.

Signed and Sealed this
Twenty-fourth Day of November, 2015

Michelle K. Lee
*Director of the United States Patent and Trademark Office*